Patented June 17, 1924.

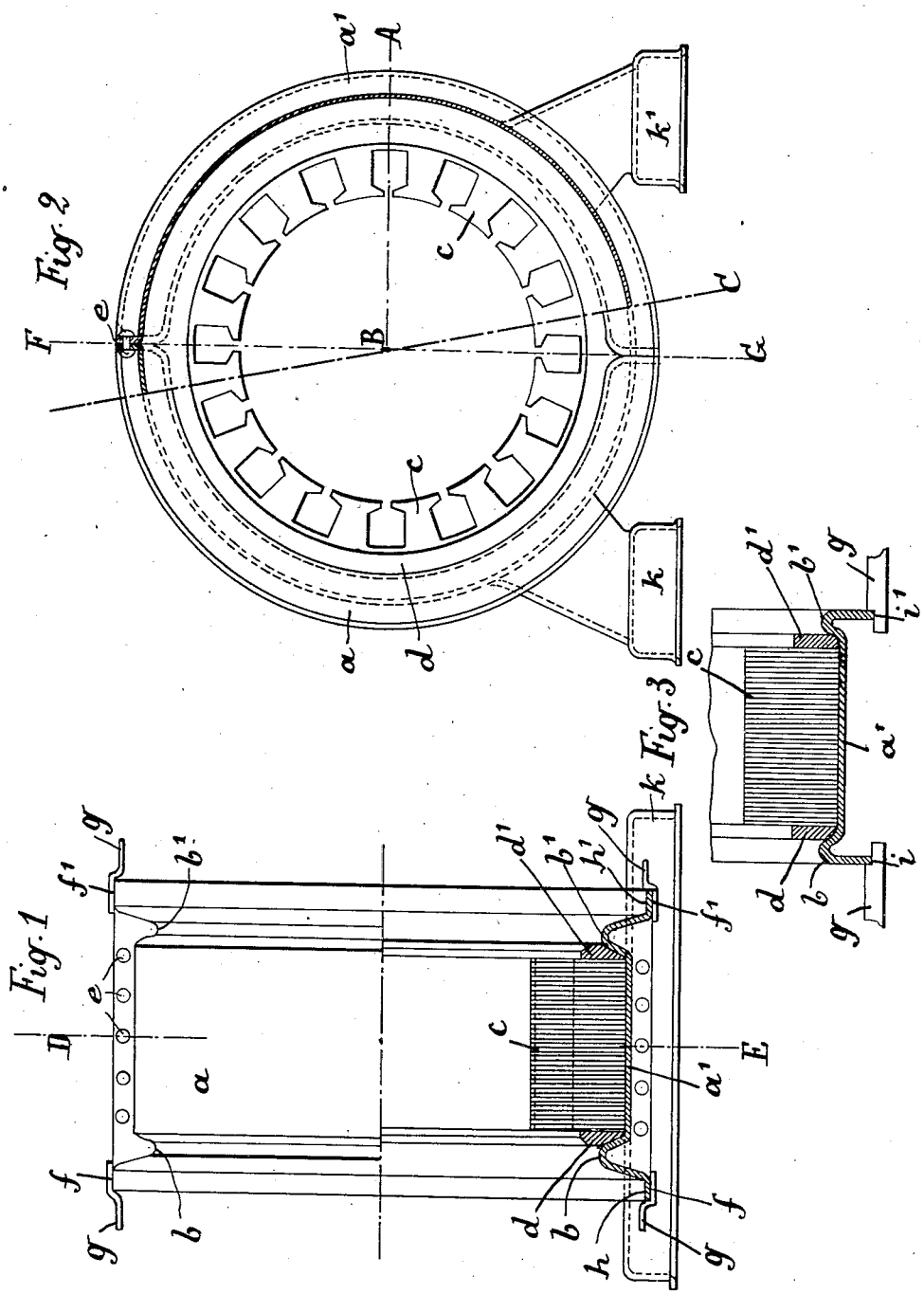

1,497,734

UNITED STATES PATENT OFFICE.

CLAUDE RAMONÉDA, OF SARRIA-BARCELONA, SPAIN.

FRAME FOR DYNAMO-ELECTRIC MACHINES.

Application filed September 29, 1920. Serial No. 413,604.

*To all whom it may concern:*

Be it known that I, CLAUDE RAMONÉDA, residing in Sarria-Barcelona, Spain, and whose post office is 15 Rue Morgenat, have invented certain new and useful Improvements in Frames for Dynamo Electric Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the manufacture of frames for electric generators or motors of the single phase or polyphase type by the use of pressed metal, and preferably sheet metal. This method of manufacture permits of reducing the metal of the frame or body of the stator which is generally cast iron and which has a relatively heavy weight.

The method according to this invention consists in substituting for the said cast iron frame a main body or frame of pressed metal and preferably of sheet metal which is constituted by a plurality of shells assembled together and having upon the inner portion thereof suitable ribs or a series of projections forming a cylindrical space in which is disposed the laminated iron ring shaped members constituting the magnetic portion or stator and provided with binding rings cooperating with the internal recess formed in the ribs of the shells. This method of manufacture of machine frames by the use of pressed metal shells thus affords the double advantage of economy in labor and material.

The accompanying drawing shows two forms of construction of this invention.

Fig. 1 shows at the lower portion a partial section on the line A, B, C, Fig. 2, and at the upper portion a partial front view.

Fig. 2 is a partial side view of the device and a partial vertical section on the line D, E, Fig. 1.

Fig. 3 is a partial vertical section of a modified form of the device shown in Figs. 1 and 2.

In the present example, the frame of the machine is constituted by two semicircular shells $a$ and $a^1$ of pressed metal each of which is provided with two similar inwardly projecting ribs $b$, $b^1$ of such construction that when the said shells are assembled upon a diametrical plane F G, these ribs will constitute a cylindrical recess into which is exactly fitted the laminated ring forming the magnetic portion $c$, this latter having been previously mounted on a mandril together with its two binding rings $d$ $d^1$ whose outer surfaces are shaped in such manner as to coincide as nearly as possible with the internal form of the ribs $b$—i. e. outer conical surface to fit the conical sides of the ribs $b$, $b^1$, with their inner flat faces lying against the stator $c$.

Before the two shells have been connected together by the rivets $e$ as here represented or by any other suitable method such as autogenous welding or the like, the stator or laminated ring $c$ provided with its binding rings $d$ $d^1$ is inserted in place, the said ring will then be exactly maintained within the body of the frame which is thus constituted.

By mounting the assemblage thus formed upon an expanding mandril disposed within the aperture of the said ring, the outer surfaces $f$ $f^1$ of the frame may be trimmed on the lathe in such manner that the end plates $g$ $g$ supporting the rotor of the machine will be given a contact surface exactly concentric with the bore of the stator. This surface may also be formed in the interior portion at $h$ $h^1$. The pressed metal shells may also be disposed as shown in Fig. 3, that is, under the extreme horizontal surfaces. In this case the supporting end plates of the rotor will have their contact surfaces at $i$ $i^1$. It should be remarked that the ribs $b$ $b^1$ may have a shorter length and not extend around the entire periphery of the frame, all that is required being that when divided or even reduced to simple projections they shall be in sufficient number to maintain the binding rings $d$ $d^1$.

In the example which has been described with reference to Figs. 1 and 2, it is supposed that the frame is formed of two assembled pressed metal shells, but it is evident that the number of shells constituting a frame may be greater according to the requirements of manufacture or the conditions of the construction. As indicated in Figs. 1 and 2, the frame can be provided with the feet $k$, $k^1$ which are also formed of stamped metal and are connected to the frame by autogenous welding, electric welding or like means. The above mentioned method of construction of the machine frames in stamped metal is also applicable to all types of continuous current generators or motors employing a laminated iron portion to constitute the outer part of the machine.

I claim—

1. A stamped dynamo frame, comprising a plurality of sheet metal shells each comprising an arcuate sector having its lateral marginal portions bent inwardly and then outwardly to form inwardly projecting ribs at said marginal portions.

2. A stamped dynamo frame comprising a plurality of sheet metal shells each comprising an arcuate sector having its lateral marginal portions bent inwardly and then outwardly, the extreme lateral edges of said arcuate sector extending radially outward beyond the exterior surface of said sector to form supports.

3. A stamped dynamo frame comprising a plurality of sheet metal shells, each comprising an arcuate sector having its lateral marginal portions bent inwardly and then outwardly beyond the intervening portions of the sector, and then bent in the direction of the axis of the sector to form arcuate seating flanges.

4. In a dynamo electric machine, a frame comprising a plurality of sheet metal arcuate sectors, each sector having its marginal portions bent inwardly and then outwardly, said bends being inclined to one another; in combination with a laminated stator, and metal binding rings having outer bevelled faces for engaging a bend at each of said marginal portions of said sectors.

In testimony that I claim the foregoing as my invention, I have signed my name.

CLAUDE RAMONÉDA.